United States Patent [19]

Lilja et al.

[11] Patent Number: 5,178,653
[45] Date of Patent: Jan. 12, 1993

[54] MULTIGAS SCRUBBER

[75] Inventors: Launo L. Lilja; Valto J. Mäkitalo, both of Pori; Bror G. Nyman, Ulvila, all of Finland

[73] Assignee: Outokumpu Research Oy, Pori, Finland

[21] Appl. No.: 869,449

[22] Filed: Apr. 16, 1992

[30] Foreign Application Priority Data

Apr. 19, 1991 [FI] Finland .................. 911899

[51] Int. Cl.⁵ .............................................. B01D 45/16
[52] U.S. Cl. ........................................ 55/238; 55/239; 55/248
[58] Field of Search .............. 55/238, 239, 237, 248, 55/257.4

[56] References Cited

U.S. PATENT DOCUMENTS

| | | | |
|---|---|---|---|
| 1,905,993 | 4/1933 | Buff | 55/239 |
| 2,687,780 | 8/1954 | Culhane | 55/238 |
| 2,696,275 | 12/1954 | Pring | 55/238 |
| 2,792,905 | 5/1957 | Forrest | 55/239 |
| 3,852,040 | 12/1974 | Gustavsson | 55/248 |
| 3,852,409 | 12/1974 | Martin et al. | 55/238 |
| 3,881,898 | 5/1975 | Darby et al. | 55/238 |
| 3,944,402 | 3/1976 | Cheremisinoff | 55/238 |

FOREIGN PATENT DOCUMENTS

82931 10/1956 Netherlands ................. 55/238

Primary Examiner—Tim Miles
Attorney, Agent, or Firm—Brooks Haidt Haffner & Delahunty

[57] ABSTRACT

The invention relates to an appparatus where the wet scrubbing of several different gas flows is carried out in at least three scrubbing towers, and the droplet separation of scurbbed gases takes place in a cyclonic, uniform droplet separator constructed of several cylinders, so that the obtained product is a pure and droplet-free gas.

14 Claims, 7 Drawing Sheets

MULTIGAS SCRUBBER

BACKGROUND OF THE INVENTION

1. Field of the Invention

The present invention relates to an apparatus where the wet of several different gas flows is carried out in at least three scrubbing towers, and the droplet separation of the scrubbed gases takes place in a uniform cyclon-type droplet separator, so that the obtained product is a pure, dropless gas.

2. Description of Related Art

Presently the tightened legislation in environmental protection sets higher and higher demands on the cleaning of exhaust gases. Above all this concerns industry and may become a threshold issue for many company, as for the continuation of production. This also means that more and more companies will invest in gas scrubbing, both in development and production as well as in new purchases.

In the majority of conventional practices, attention is paid to the scrubbing phase only, with the confidence that some separate, ready-made filter serves well enough as the droplet separator. This means that the scrubber units easily become bulky groups of miscellaneous constructions, if there are more gas lines than one. It is, however, pointed out that easy maintenance and effective droplet separation are in most cases almost as important as the scrubber unit itself.

An ideal solution for such cases is a combined scrubber and droplet separator unit, where the exhaust gases from different stages can be conducted separately and discharged directly into open air.

In principle, the scrubbing of gases can thus be divided into two stages, i.e. the scrubbing proper and the successive droplet separation. The scrubbing methods and requirements largely define what kind of scrubber is best. The same applies to droplet separators.

A very popular principle is the venturi principle. In practice this includes two different types. One type uses a water spray to give strength and energy to the scrubbing, and at the same time the spray serves as a kind of blower, a suction fan. In the other type, the gas itself renders strength to the process, in which case the gas must be pressurized.

Both of the above mentioned scrubber types are described to a great detail in literature, for example in the following references: (1) H. Brauer, Y. B. G. Varma: Air Pollution Control Equipment, Springer-Verlag 1981, or (2) W. Strauss: Industrial Gas Cleaning, Pergamon Press 1975.

One problem when using venturi scrubbers, as well as with other scrubber types, is changing the capacity. The patent specification FR 2,452,311 introduces a system where a collar restricting the gas flow is formed in the venturi shaft by means of an annular water layer. By adjusting the thickness of the water layer, any changes in the capacity can be easily responded to.

Another, perhaps even more problematic situation is created when the capacity rises to a higher order. In that case the range of the water spray in relation to the gas flow is not sufficient, no matter which of the two venturi systems is employed. In order to solve this problem, for instance the reference (1), on pages 109 and 110, introduces applications with several venturis instead of only one.

Centrifugal force can also be made use of in gas scrubbers. A wet cyclone based on this idea is described for instance in the U.S. Pat. No. 2,696,275 and on the page 374 of reference (2), where a centrifugal wet scrubber and a turbulence phenomenon created by means of guiding vanes is introduced.

From the U.S. Pat. No. 3,456,928, there is known a scrubber based on a kind of a blower effect, where the gas flow is allowed to blow towards the surface of the water collected on the bottom of the scrubber.

Upwards rising gas to be cleaned can be put to contact with downwardly directed water sprays by using a cylindrical scrubbing vessel, as is described in the U.S. Pat. No. 3,773,472. The direction of the two flows can also be opposite. A similar type of scrubbing method, where the scrubbing cylinder is filled with filler particles, is described for instance on pages 122-123 and 129 of reference (1).

Different types of droplet separators are described for instance on pages 219-239 of reference (1). The main droplet separator types are based on the zig-zag principle, centrifugal principle or conventional filter principle.

According to the present invention, the gas or gases to be scrubbed are conducted into at least three vertical scrubbing tubes, and thereafter into a uniform droplet separator formed of several nested cylinders, where the gases are forced in a rotary motion and the pure and droplet-free gas is drained through a drain tube located in the middle of the scrubbing tubes. The essential novel features of the invention are apparent from the appended patent claims.

An advantage of several scrubbing tubes is that even with large gas volumes, the scrubbing process still remains well under control. In droplet separation, the uniform treatment of even large amounts of gases has not caused problems—on the contrary, from the point of view of building technique, it is simpler to construct a compact apparatus where all of the gas, even a large amount, is conducted to. Nowadays, owing to the said strict air-protective legislation, the tendency is to clean the gases of more and more components, and consequently the scrubber of the present invention with several scrubbing tubes is well suited to this purpose. At the droplet separation stage, solid particles have already been removed, and therefore it is even more recommendable to treat the gases flexibly together. Moreover, the apparatus is particularly suitable for treating emissions, because after cleaning, all of the gases can be discharged into open air.

Gases are conducted into the scrubbing tubes either separately, or after first combining them in the preliminary chamber and then distributing them into the tubes. The scrubbing tubes can be mutually similar or different, both in operation and size, depending on the scrubbing requirements—advantageously, however, they are similar. Because the tubes can differ from each other, it is possible to use the apparatus for treating emissions from different types of sources, and each emission type can be treated in a unit particularly designed for it. Thus the scrubbing tubes can be for instance a venturi scrubber, a centrifugal wet scrubber, a spray-type scrubber or a filler scrubber. The essential point is that the scrubbing tubes are located symmetrically with respect to each other. After the scrubbing process, the scrubbed gases are allowed to collide in the water gathered in the largest cylindrical vessel of the scrubber of the invention, which collision leads to the second stage of the scrubbing process.

The gases scrubbed in the scrubbing tubes are tangentially conducted, each along its specific conduit, to the next cylinder. Only in this cylinder, the gases are combined. The tangential path is arranged by means of auxiliary walls in the chamber and by possible blade extensions. This second largest cylinder begins, in the vertical direction, from the ceiling of the scrubbing chamber, and ends—as open—underneath the water level. Thus conditions for a simple and effective droplet separation are created; for the tangential feeding of gases secures the operation of centrifugal forces, so that the rotary gas flow is burst into the next inner cylinder through the annular opening located in between this inner cylinder, its bottom part and the water surface. From this inner cylinder, the gas is discharged, through the smallest cylinder, and according to a normal cyclone effect, upwards droplet-free.

The scrubbed, droplet-free yet saturated gas can be conducted directly to the open air or, if conditions particularly require, through a heat exchanger formed by the hot gases entering the scrubber for cleaning, in which case the temperature of the gas to be drained rises to a level where water is not condensed on the possibly cold walls of the drain pipe. This fact is observed particularly when scrubbing in unheated facilities.

BRIEF DESCRIPTION OF THE DRAWINGS

The invention is described in more detail with reference to the appended drawings, where.

DETAILED DESCRIPTION OF PREFERRED EMBODIMENTS

Figure 1:
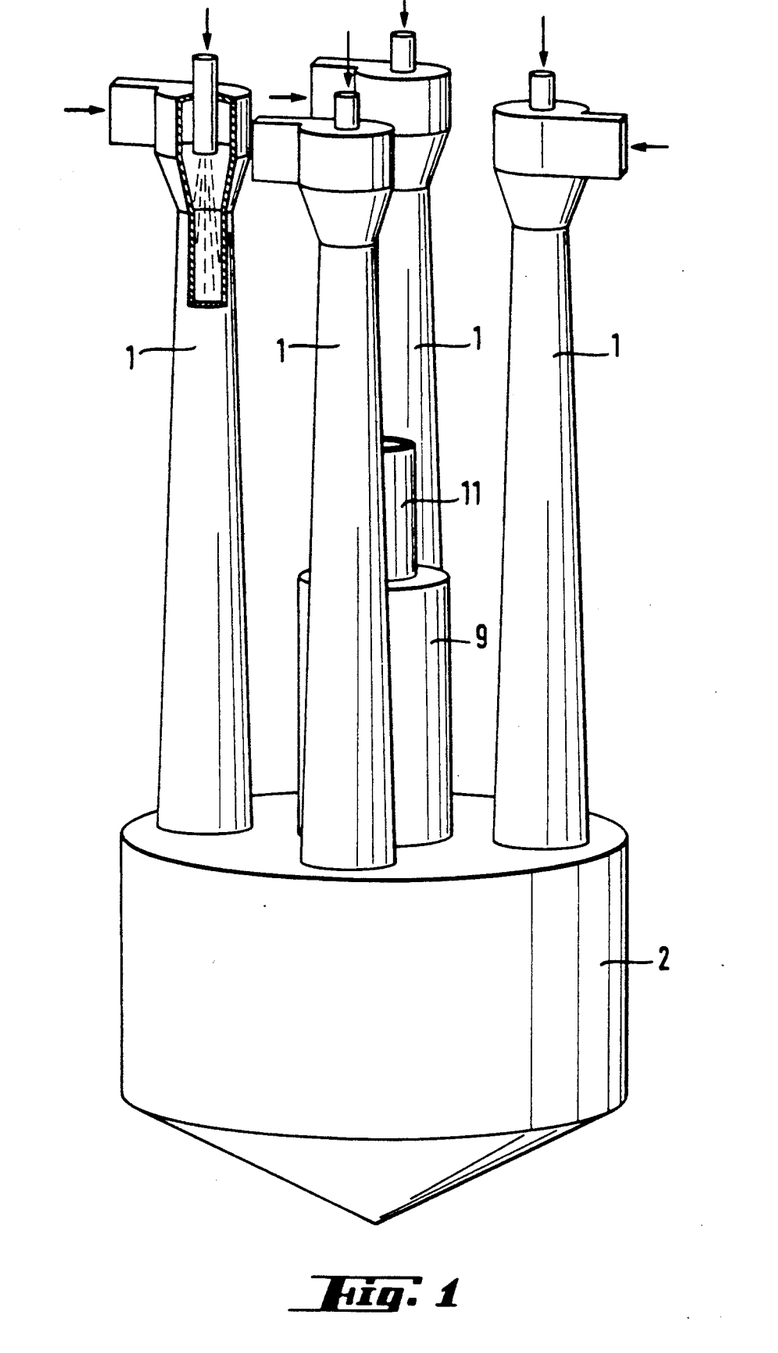
FIG. 1 illustrates the basic principle of a scrubber of the invention, comprising four different venturi scrubber units.
Figure 2:
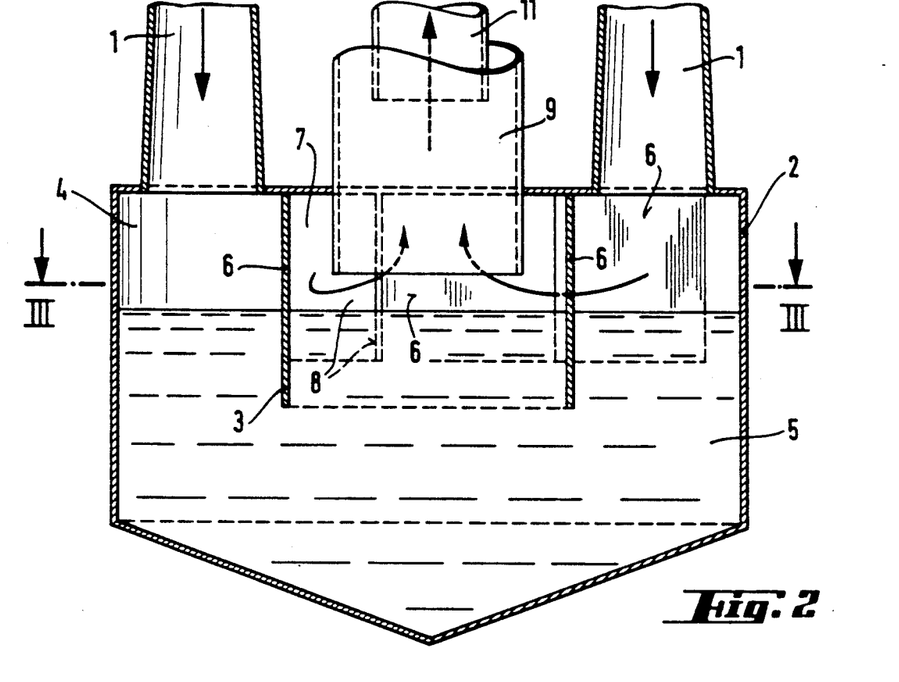
FIG. 2 is a lengthwise cross-section of the bottom part of the scrubber of FIG. 1, FIGS. 3 a, b and c illustrate different alternatives as transversal cross-sections of FIG. 2, FIGS. 5 a, b and c illustrate scrubbing tubes operated with different scrubbing methods, and FIGS. 6 a and b, illustrate embodiments of FIG. 1.

In the scrubber embodiment of FIG. 1, it is apparent that the gas to be scrubbed enters through at least three, in this case four scrubbing tubes 1. In the case of FIG. 1, the tubes are venturi tubes. As is seen, gas is conducted tangentially into the venturi, but it can also be conducted in a straight line. The scrubbing tubes 1 are located in a scrubbing chamber 4 formed by the space left in between the outer cylinder 2 and the next cylinder, i.e. the distribution cylinder 3, symmetrically above the scrubbing chamber. The gases to be conducted to the separate scrubbing tubes do not have to be mutually similar; one part may come for instance from a submerged evaporator connected to the regeneration unit of pickling acids, a second part from the delay crystallizer of the same regeneration process, and a third part from some other unit of the regeneration creating flue gases, etc. As is seen in FIG. 2, on the bottom of the scrubbing chamber 4, there is water or other scrubbing liquid 5 used in the washing of gases. The bottom of the scrubbing chamber can be conical, or it may have a flat bottom.

Figure 3A:
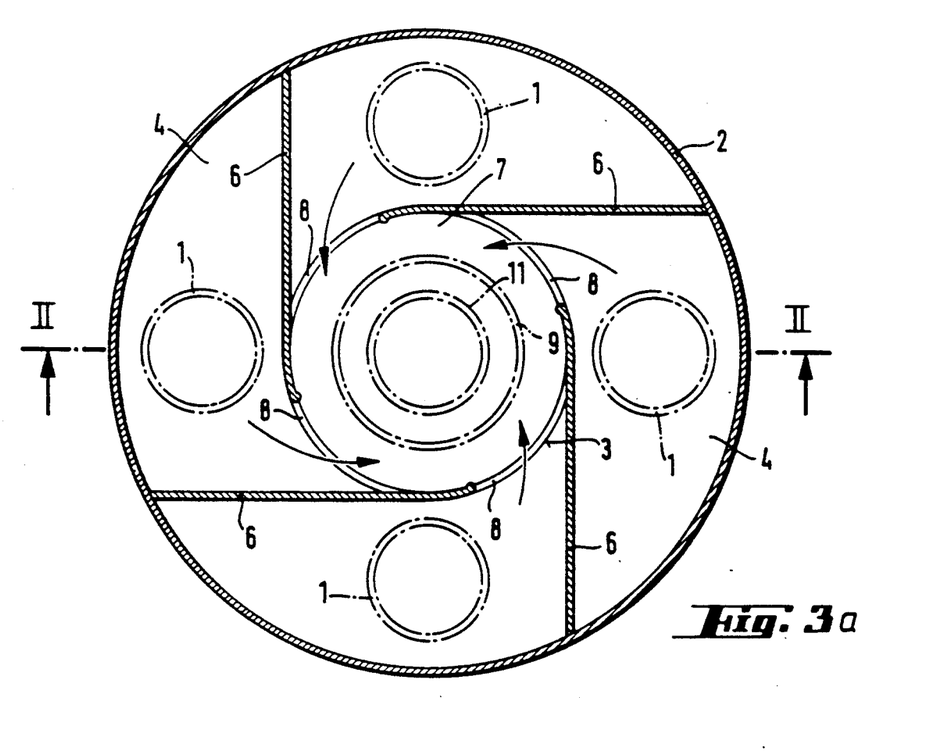

FIG. 3a illustrates how the interior of the scrubbing chamber is provided with partition walls 6, extending from the outer cylinder to the distribution cylinder 3, so that the gas emitted from each scrubbing tube is directed, through the channel formed by the specific partition walls, to an inner swirl chamber 7. In the top part of the distribution cylinder 3, above the liquid surface, there are provided apertures 8, through which gas flows into the swirl chamber. The number of the partition walls is always the same as that of the scrubbing tubes. The partition walls 6 are constructed to be inwardly turnable, so that for each gas flow they form a channel which is tangential with respect to the inner cylinder 9. Of course the partition walls do not necessarily have to be tangential, the main thing is that they force the gases to a rotary motion. Thus the gases are set to rotary motion in the swirl chamber 7 formed in between the distribution cylinder and the inner cylinder 9 therein, and in this swirl chamber there is formed a uniform whirl flow of scrubbed and saturated gas, which is released inside the cylinder 9 as an even, symmetrical whirl rotating at a increasing speed.

Figure 3B:
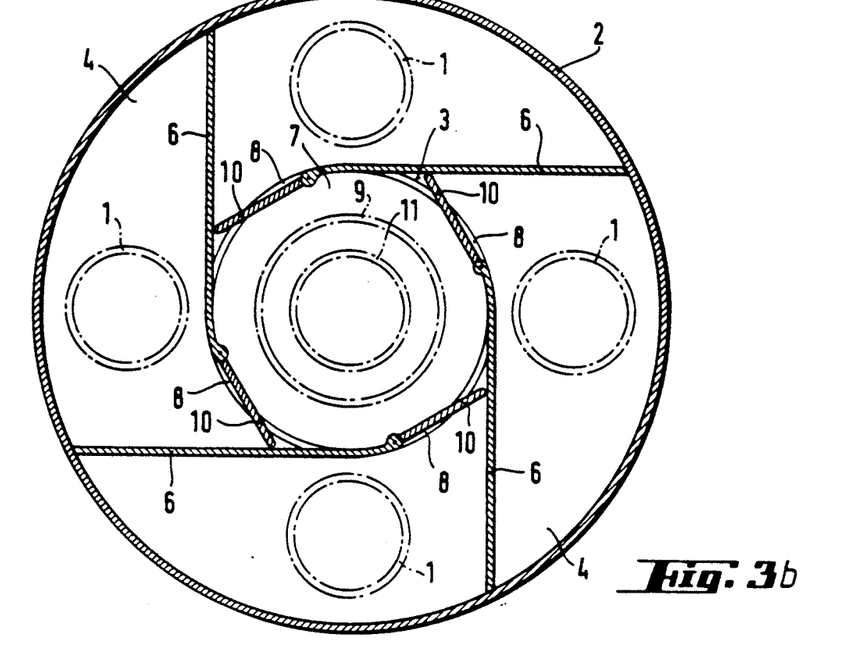
Figure 3C:
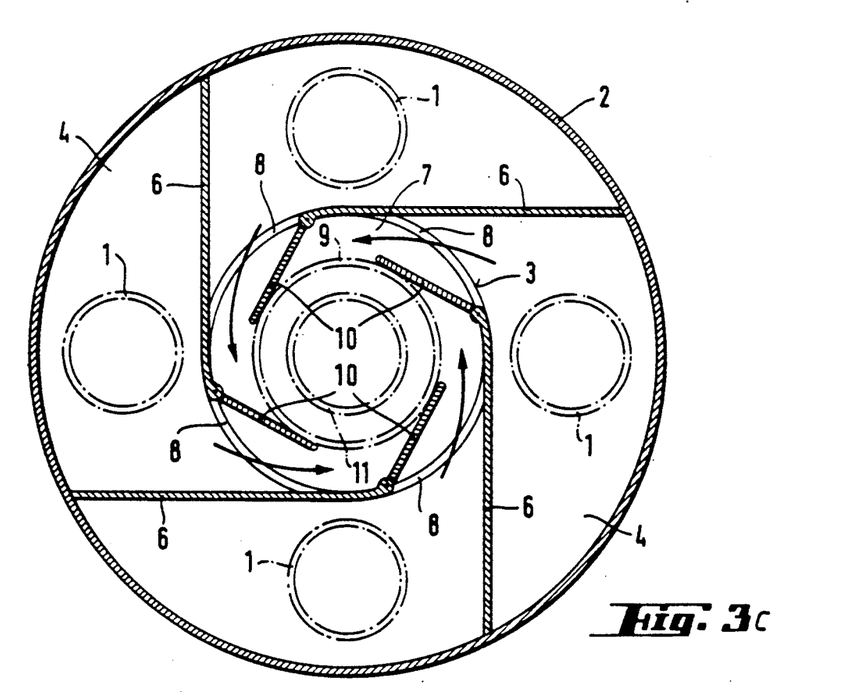

In the swirl chamber 7, the separate gas flows are combined and flow upwards as one uniform flow. It is pointed out that the change of direction for the gases is carried out essentially above the free liquid surface. This removes the major part of the liquid and reduces the load of the droplet separator. As is seen in FIGS. 3b and 3c, particularly in cases where the feeding of some gas to be scrubbed is desired to be interrupted, it is possible to furnish the scrubber with blade extensions 10 provided with hinges in between the cylinders 3 and 9. The blade extension 10 may be constructed movable, so that it closes in a flap-like fashion, if for instance gas does not flow in through a given section. The flap may be closed by overpressure, or it can be done manually or automatically. In FIG. 3b, all blade extensions are in a closed position, and in FIG. 3c all blade extensions are open.

In the vertical direction, the partition walls 6 extend from the top edge of the scrubbing chamber to below the liquid surface, so that the gas is always forced to whirling motion when flowing into the swirl chamber. In the swirl chamber, and further in the inner cylinder 9, the rotation of the gases causes the solid particles and liquid drops to be released from the gas to the liquid. A possible carrying away of the liquid droplets to the gas flow from the liquid surface can further be prevented by some suitable arrangement, for instance by using a preventive cone. By arranging a water washing in the inner surface of the inner cylinder 9, the particles or harmful gas components still remaining in the gas flow and emitted on the walls in the cylinder 9 can be absorbed in a water film flowing down along the wall and conveyed into the washing liquid 5. The scrubbed, droplet-free saturated gas is drained through the innermost cylinder, i.e. the drain cylinder 11, which is located in the middle of the scrubbing tubes.

Consequently an effective droplet separation, achieved with structures of maximal simplicity, is in the apparatus of the present invention realized as follows: the gas flows, discharged from three or more scrubbing tubes and colliding with scrubbing liquid collected on the bottom of the scrubber, are turned from mainly vertical direction to horizontal direction, and directed advantageously tangentially to droplet separation. The gases are combined, and in the next cylindrical swirl chamber (scrubbing chamber) they are formed into a symmetrical whirl field strengthening towards the center and forced into another swirl chamber, where the liquid droplets contained in the gas are discharged on the walls of the cylinder 9, whereafter the whirl flow is drained from the droplet separator through the still smaller drain cylinder 11.

Owing to the operation of the above described four nested cylinders, the scrubber is called FCS (Four Cylinder Scrubber). As is seen in the drawings, the cylinders are all concentric, so that the diameter of the inner cylinder is always shorter than that of the previous cylinder.

Figure 4A:
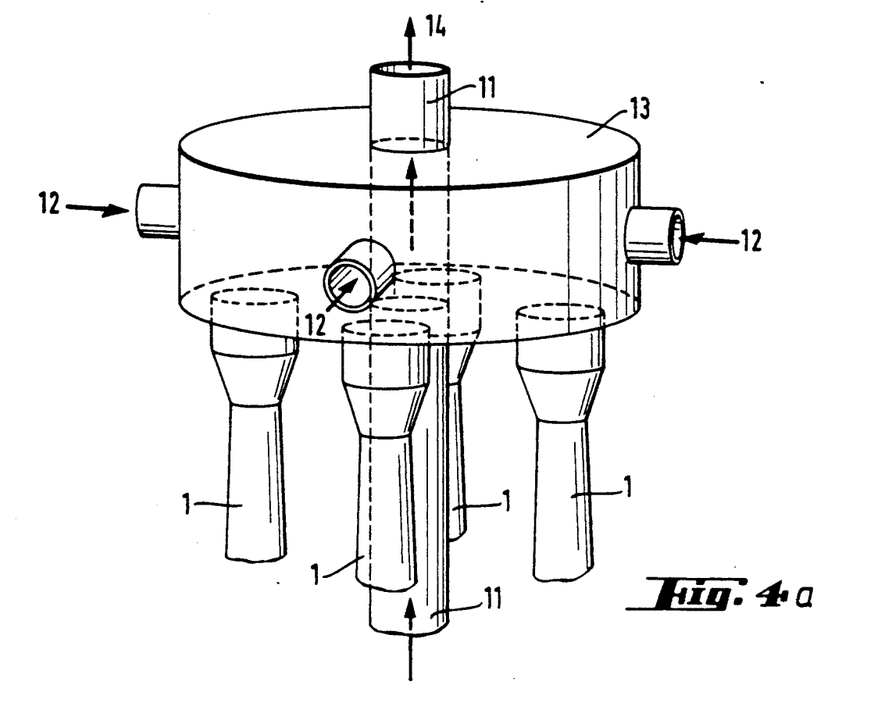
Figure 4B:
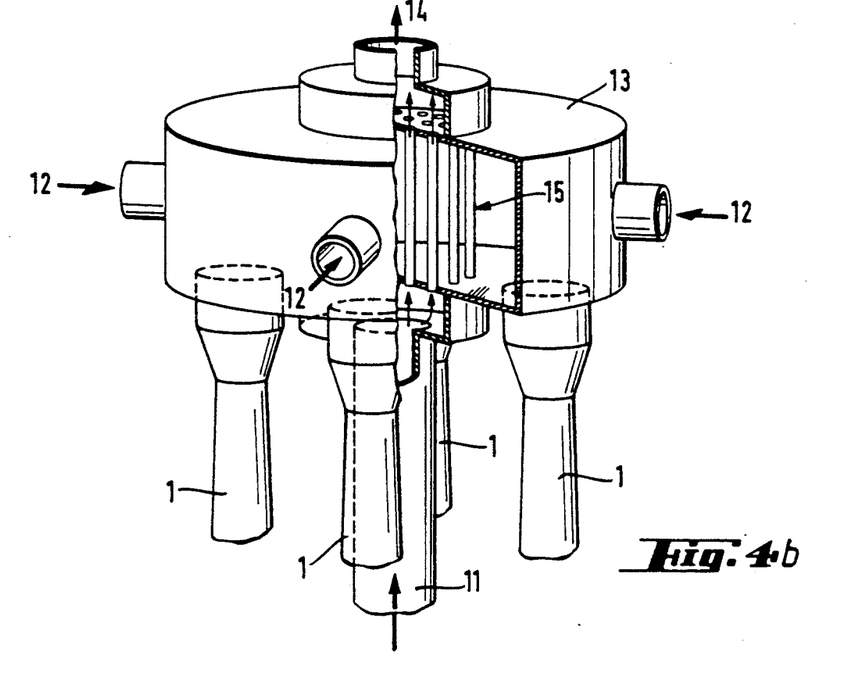

According to FIG. 4a, the different gas flows 12 can be combined already before the scrubbing tubes by conducting all to the front chamber 13, wherefrom they can be symmetrically distributed to the different scrubbing tubes. Advantageously the front chamber is arranged so that it surrounds the drain cylinder 11, in which case the draining gases 14 are heated up to a temperature where the gases are not recondensed, even if the drain tube walls are cold. This is particularly advantageous from the point of view of preventing corrosion. In the embodiment of FIG. 4b, the draining gases 14 flow, after the drain cylinder 11, through a heat exchanger tube arrangement 15, formed inside the front chamber 13, which arrangement heats the draining gases 14 even more effectively than the previous method.

Figure 5A:
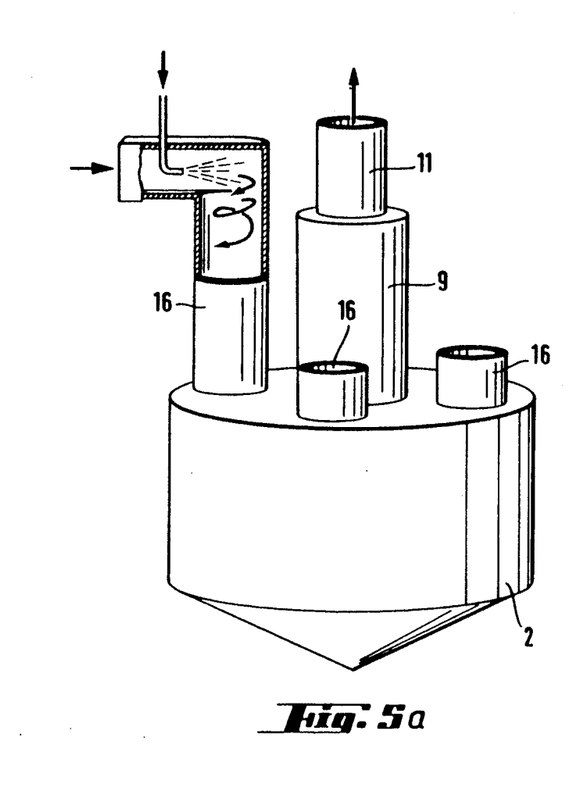
Figure 5B:
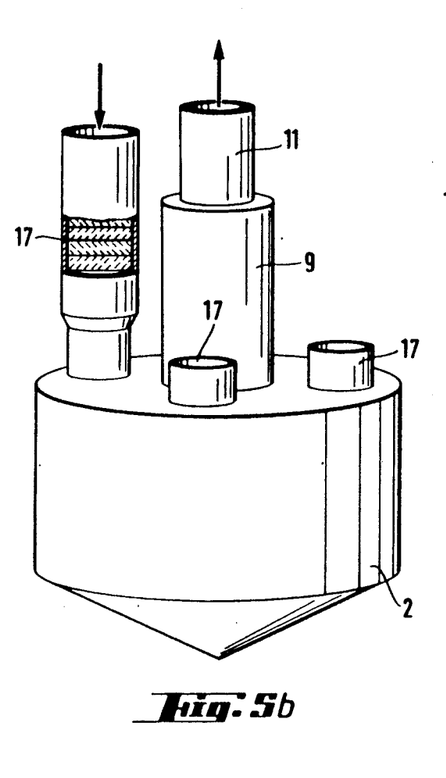
Figure 5C:
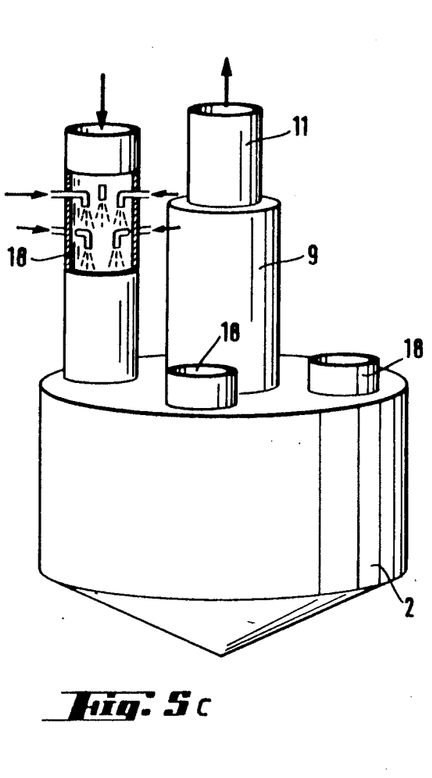

As was pointed out above, a venturi scrubber is not the only scrubber alternative, but the scrubbing tubes may be based on other known principles as well. FIGS. 5, a, b and c, illustrate various structural alternatives for the scrubbing tubes; FIG. 5a illustrates a scrubbing tube 16 operated according to the centrifugal scrubbing principle; FIG. 5b illustrates a scrubbing tube 17 filled with filler particles; and FIG. 5c illustrates a scrubbing tube 18 operated according to the spray principle. The essential feature is, however, that the scrubbed gas entering from all these scrubbing tubes is conducted into a uniform droplet separator constructed of four nested cylinders, above which droplet separator, or alternatively at the sides whereof, the tubes are advantageously arranged. Another essential feature is that in the swirl chamber, the gases are set to a whirling motion, so that the droplets are separated from the gas.

The invention is further described with reference to the appended examples.

EXAMPLE 1

Three different gases must be scrubbed, so that gas A is fed from one process unit, gas B is fed from two process units and gas C from three process units. There are at least two different solutions.

SOLUTION 1

Figure 6A:
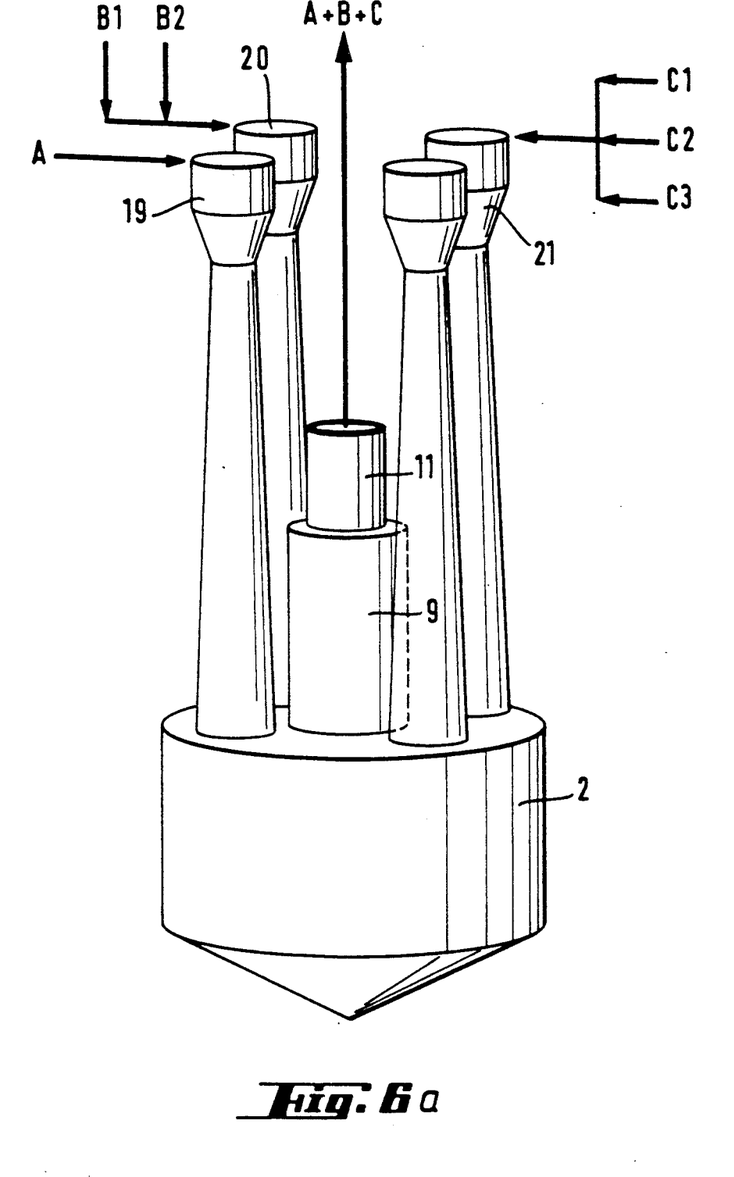

According to FIG. 6a, there are used water-spray operated venturis, three in number. Gas A enters the venturi 19, gases B are combined prior to the venturi 20, and gases C are likewise combined prior to the venturi 21. Thus the venturis are separate, according to FIG. 6a, and the discharge gases are not reheated.

SOLUTION 2

Figure 6B:
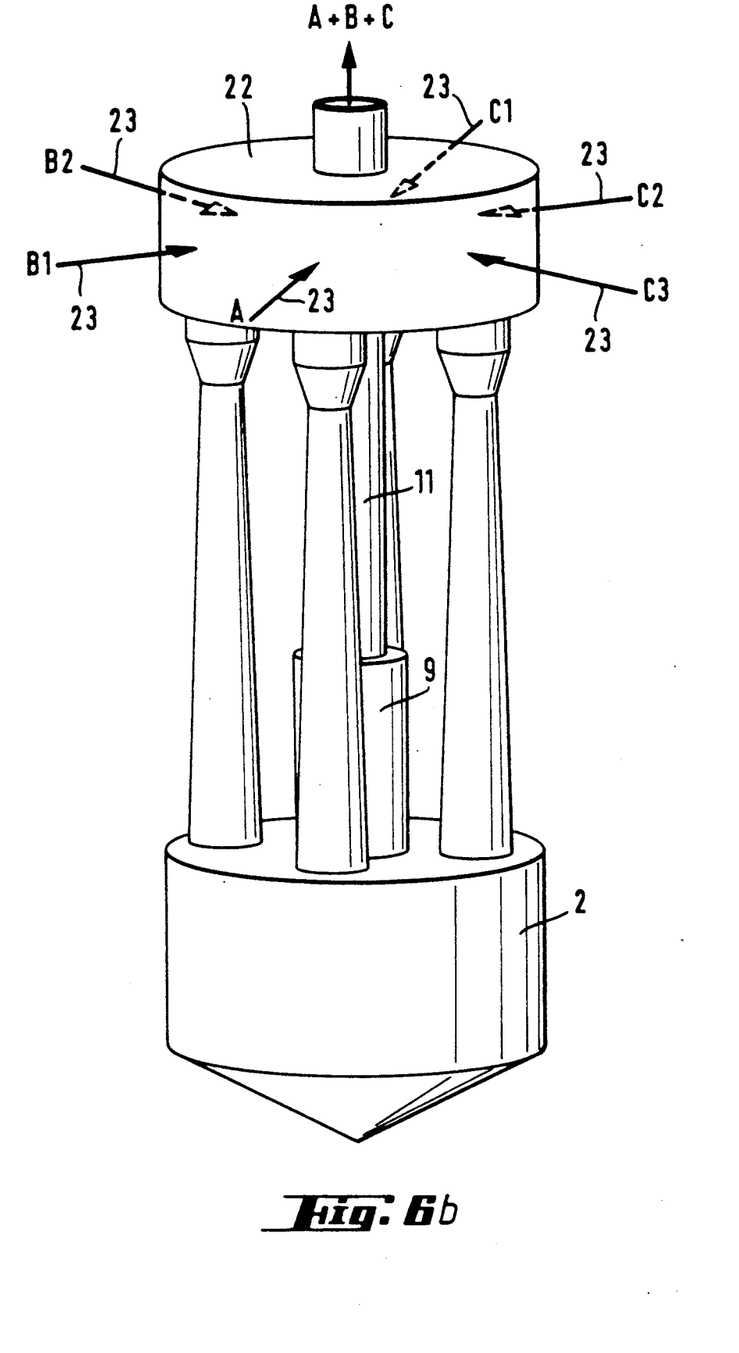

There is provided a front chamber 22 according to FIG. 4a, as is illustrated in FIG. 6b. Into this front chamber, there are conducted A-gases, B-gases and C-gases through six symmetrically positioned tubes, in which case all of the gases in a way obtain the same position and are combined in the front chamber. The position of the tubes 23 (indicated with arrows) feeding to the chamber can be directed towards the front chamber from the side, from the top or even tangentially. In this case the temperature of the pure, saturated gas can be increased by making use of the higher temperature of the new gases entering the process.

EXAMPLE 2

The gases to be scrubbed contain nitric oxides, sulphur oxides and hydrogen fluorides which are created when aerating the equipment facilities of the so-called OPAR process (OPAR=Outokumpu Pickling Acid Recovery, see for example Proceedings of CIM Svmoosium on Iron Control in Hvdrometallurgy, Toronto, Oct. 19-22, 1986). The first gas type is a 145° C. gas from a submerged evaporator, flow rate 1000 $Nm^3/h$, containing all of the above mentioned components. The second gas type, containing mainly nitric oxides, is sucked from two delay crystallizers located outside. The gas temperature is 80° C., and the flow rate from both crystallizers 500 $Nm^3/h$. The third gas, likewise containing nitric oxides but with lower contents, is sucked from three points located inside the said pickling acid regeneration plant. In this fashion, the regeneration salt concentrator, the pump tank of the salt filter, and the pump tank collecting overflow from the concentrator, are all aerated. The temperature of these gases, too, is 80° C., and the flow rate from the points of each location roughly 350 $Nm^3/h$.

It could have been possible to arrange the said multigas scrubbing according to the solution 1 of Example 1, by using a separate venturi for each gas type as is illustrated in FIG. 1. Because, however, the said gases are nearly dust-free, and because it was also desired to heat the scrubbed gas above the dewpoint, a multigas scrubbing process was chosen for this case—following the procedure of solution 2 of Example 1.

The employed scrubber is provided with a front chamber as in the embodiments of FIGS. 4a and 6a. The gases to be scrubbed are conducted into the top part of the cylinder, through six tubes located symmetrically with respect to each other. In the front chamber, the gases are mixed with each other while the temperature in this case sets at about 115° C. in the top part of the chamber. While flowing through the chamber, the gases are cooled by nearly ten degrees, whereas the cleaned gas flows in the drain tube passing through the chamber and is heated a little more. The employed scrubbing solution is acid water in the scrubbing, which is circulated, via the cooler, to the said venturis beginning from the front chamber.

The scrubbing result is improved from what it was when using large separate venturis. The symmetrical multiscrubber structure promotes a good gas/scrubbing solution contact. Another important factor is the premixing of gases to be scrubbed, which balances the load of the scrubber. Moreover, the running and adjusting of this scrubber is easier than the controlling of several separate scrubbers. By incorporating the flue gases from the delay crystallizer of the OPAR process into the scrubbing circuit, the recovery of regenerated nitrogen was increased from 97% to 98,5%, i.e. nearly as high as the recovery of fluoride (99%). The scrubbing solution collected from the scrubbing could thus be used as a pickling acid for refined steel, together with the acid formed elsewhere in the regeneration process. Thus the multigas scrubber producing a homogeneous scrubbing solution, whereby the recovery of both nitrogen and fluoride are increased to nearly 100%, helps adjusting the composition of the pickling acids, and thus the pickling process itself.

We claim:

1. An apparatus for scrubbing several different with liquid, at least in three scrubbing tubes (1), and for separating droplets from the scrubbed gases in a droplet separator, characterized in that the scrubbing tubes (1) are symmetrically opened to a scrubbing chamber (4), which is formed of a space confined by an outer cylinder (2) and a distribution cylinder((3) located therein, and that inside the scrubbing chamber (4), there are provided inwardly turnable partition walls (6) extending in the vertical direction from the ceiling of the scrubbing chamber (4) to below the liquid surface, the number of these partition walls being the same as that of the scrubbing tubes; that horizontally the partition walls extend from the outer cylinder (2) to the distribution cylinder (3), and set the gas flowing into the scrubbing chamber (4) in whirling motion; that inside the distribution cylinder (3) there is concentrically installed another inner cylinder (9), extending at the bottom to above the scrubbing liquid surface and forming an aperture for the whirl flow, in order to intensify droplet separation, as well as a concentric drain cylinder (11) arranged to rise upwards from the top of the inner cylinder (9); through this drain cylinder (11), the scrubbed, droplet-free gases are drained.

2. The apparatus of claim 1, characterized in that the partition walls (6) are arranged essentially tangentially with respect to the inner cylinder (9).

3. The apparatus of claim 1, characterized in that in the distribution cylinder (3), there are provided apertures (8) in the part above the liquid surface in order to make the gas flow from the scrubbing chamber (4) to the swirl chamber (7).

4. The apparatus of claim 1, characterized in that the partition walls (6) are provided with blade extensions (10).

5. The apparatus of claim 4, characterized in that the blade extensions (10) are movable.

6. The apparatus of claim 1, characterized in that all cylinders forming the droplet separator are concentric.

7. The apparatus of claim 1, characterized in that the drain cylinder (11) is located symmetrically in the middle of the scrubbing tubes (1).

8. The apparatus of claim 1, characterized in that the scrubbing tubes (1) are all similar.

9. The apparatus of claim 1, characterized in that the scrubbing tubes (1) are all different.

10. The apparatus of claim 1, characterized in that the scrubbing tubes (1) are operated according to the venturi principle.

11. The apparatus of claim 1, characterized in that the scrubbing tubes (1) are operated according to the centrifugal principle.

12. The apparatus of claim 1, characterized in that the scrubbing tubes (1) are operated according to the spray principle.

13. The apparatus of claim 1, characterized in that the apparatus is provided with a front chamber (13, 22) where all gases are connected to prior to distributing them into the scrubbing tubes.

14. The apparatus of claim 13, characterized in that the front chamber (13) surrounds the drain cylinder (11) and thus forms a heat exchanger for the gases to be drained.

* * * * *

UNITED STATES PATENT AND TRADEMARK OFFICE
CERTIFICATE OF CORRECTION

PATENT NO. : 5,178,653
DATED : January 12, 1993
INVENTOR(S) : Launo L. Lilja et al.

It is certified that error appears in the above-identified patent and that said Letters Patent is hereby corrected as shown below:

Title Page, In the Abstract:

line 4, "of scurbbed gases takes" should read:

--of scrubbed gases takes--.

Column 1, line 7, "the wet of several gas flows" should read:

--the wet scrubbing of several different gas flows--.

Column 3, after line 37, the following has been omitted:

--Figs. 4, a and b, illustrate alternatives for the front chamber,--.

Column 6, Example 2, line 11:

"Sumoosium" should read: --Symposium" and

"Hvdrometallurgy" should read: --Hydrometallurgy--.

UNITED STATES PATENT AND TRADEMARK OFFICE
CERTIFICATE OF CORRECTION

PATENT NO. : 5,178,653
DATED : January 12, 1993
INVENTOR(S) : Launo L. Lilja, et al It is certified that error appears in the above-indentified patent and that said Letters Patent is hereby corrected as shown below:

Column 7, line 2, "different with" should read ---different gas flows with---.

Signed and Sealed this

Fourteenth Day of December, 1993

Attest:

BRUCE LEHMAN

Attesting Officer     Commissioner of Patents and Trademarks